Patented Oct. 12, 1943

2,331,807

UNITED STATES PATENT OFFICE 2,331,807

POULTRY GRIT

Vincent H. Shea, Nashua, N. H., assignor to Allied Minerals, Inc., Westford, Mass., a corporation of Massachusetts No Drawing. Application January 23, 1942, Serial No. 427,949

9 Claims. (Cl. 99—4)

The present invention relates to a food product and more particularly to a poultry grit.

Grit particles are an essential element in the ration of poultry, such particles being required as a grinding medium in the digestive processes of the bird. Grit has commonly been supplied to poultry in the form of crushed oyster shell or limestone.

Poultry grit supplied to the fowl in these forms is subject to a number of disadvantages. Among these is the fact that both limestone and oyster shell are soluble in the dilute hydrochloric acid (normally about 5%) in the gizzard of the fowl. As a result, the grit particles are dissolved and their value as a grinding medium is destroyed.

Another essential element in the ration of poultry is calcium. In the case of laying fowl, considerable quantities of calcium are required to form the egg shells. Even in the case of broilers or other non-laying fowl, calcium for bone growth, etc., is a necessary food element.

Calcium has been supplied to poultry in the form of finely-divided calcium compounds mixed with mash. In order to supply an adequate quantity of calcium, however, it is necessary to add so much of it to the mash that the fowl is deprived of essential nutriment. The calcium is not itself nutritious and in the mash it displaces needed nutritional ingredients.

For these and other reasons, the feeding of both grit and calcium to poultry has been unsatisfactory.

It is an object of the present invention to provide an improved poultry grit or food by means of which essential grit, calcium, and other ingredients may be supplied to the fowl and at the same time the amount and relative proportions of these different elements taken in by the individual fowl may be properly and accurately controlled. Other objects will in part be obvious and will in part appear as the description proceeds.

The poultry feed of the present invention comprises grit particles which in part are substantially insoluble in the dilute acid found in the gizzard of the fowl and in part are slowly soluble in said acid, said particles being associated with a source of calcium. In this composite food, the insoluble grit particles, for example granite, serve as a grinding material, the source of calcium, for example calcium carbonate flour, provides calcium, and the difficulty soluble grit particles, for example, limestone, serve both as a supplementary grinder and as a supplementary source of calcium.

The needs of different types of poultry for calcium will vary considerably, depending upon whether the fowl is a broiler, layer or chick, upon the stage of growth, the season of the year and other considerations. Laying hens, however, normally require grit and calcium in roughly the proportion of 30% grit to 70% calcium as carbonate. On this basis, one poultry feed embodying my invention might comprise the following ingredients and approximate proportions by weight:

|  | Per cent |
|---|---|
| Granite grit | 20–40 |
| Calcium carbonate grit | 20–40 |
| Calcium carbonate flour | 30–50 |

When the composite poultry grit of my invention is swallowed by the fowl, the calcium carbonate flour or other calcium source, which may conveniently occur as a coating on some or all of the grit particles, is first dissolved by the acid in the digestive system of the bird, for example within three to twelve hours after ingestion. The calcium carbonate or other difficultly soluble grit functions for a while as a grinding medium, but in time, for example within forty-eight hours, more or less, it is in turn dissolved and serves as a supplementary source of calcium. The granite or like grit is insoluble in the digestive juices, but eventually, for example in perhaps one hundred hours, it is worn down and broken up to the point where it is eliminated by the bird.

As an example of one process suitable for the manufacture of my improved poultry feed, the following may be given. Granite and limestone grits in the proportions desired are mixed in a drum mixer. The binder may be added in the form of a finely-divided spray, with water, in quantity just sufficient to moisten the grit. A preferred binder is sodium silicate. Among other binders, casein may be mentioned. Or dry cement powder added to the calcium carbonate flour may act as a binder. After the grit is moistened with the binder, limestone flour is added and the mixture is agitated. The grit picks up a coating of limestone flour. Additional atomized binder and flour are added, with the result that the grit particles roll up the required coating of calcium carbonate flour. The coated grit is then discharged from the mixer and dried in a rotary dryer in a current of warm air. The dryer is preferably provided with screening to turn the particles over gently, so as not to wear off the coating, but sufficiently for even heat distribution. The dryer is rotated at slow speed to protect the coating until it is baked hard. After drying, the composite feed is screened to size.

In coating granite grit with calcium carbonate, it has been found difficult to get as much as 70% of calcium carbonate coated on 30% of granite or other insoluble grit, without deleteriously affecting the product. For example, when sodium silicate is used as a binder for the calcium carbonate flour, too much binder is required and the product is too alkaline. The use of excessive amounts of binder gives rise to other difficulties. If too much binder is added, the mix will be moist, so that constituent particles will stick together and, in addition, balls of lime may form on drops of water as cores, without any grit base. With my invention, however, these difficulties are obviated.

Whereas difficulty has been experienced in feeding calcium requirements to poultry as an ingredient in the mash, the calcium in my improved poultry grit goes into the gizzard and does not take up food space.

Calcium carbonate flour, when used as a coating material for the grit, may, for example, advantageously be of such particle size that all of it will pass through a 40-mesh screen, 75% of it will pass through a 100-mesh screen, and 60% of it will pass through a 200-mesh screen.

Fine particle sizes in the coating material result in a shiny coating, which is attractive to the birds.

In place of limestone and/or granite grit as a base for my coated poultry grit, oyster shell may be used. The oyster shell may be crushed and particles of suitable size may be used as a grit base. Finely-divided oyster shell, essentially in the form of flour, may be used in the coating.

In place of granite grit, there may be used such stone or rock as gravel, traprock or other material, either natural or synthetic, which is substantially insoluble in the dilute acid in the gizzard of a fowl. Such material, however, should be free or substantially free from fluorine, which is toxic to poultry. The grit should contain not over 150 parts per million of fluorine and preferably not over 100 parts per million.

Dolomite minerals should not be used in poultry feed, since dolomite also has a toxic effect on poultry.

When I use the words "grit" or "grit-like," or words of like import in this specification and in the appended claims, I do not necessarily mean that the material is gritty in the same sense as sandpaper, for example. These words refer to any particles of material suitable for poultry grit, whether they have rough or smooth surfaces.

Other ingredients, for example vitamins or medicaments such as manganese sulfate, nicotine, iodine or the like, may be added to my improved poultry feed.

The invention provides a particularly advantageous means of supplying so-called "trace" minerals, vitamins and other medications, which are required by the fowl only in small amounts. Normally, considerable difficulty is experienced in administering such foods or medications, because some birds get too large a quantity and others too little. When added to my composite poultry food, however, these "trace" ingredients may be properly apportioned to each individual fowl.

The added ingredients may either be incorporated in the coating or impregnated in or coated on the stone.

When impregnated in the stone, such ingredients are available to the fowl only when the stone breaks down in the gizzard. Granite, for example, will absorb about 0.2 to 0.4% by weight of water or other liquid. In order to absorb this liquid, the granite must first be dried to make the minute air spaces within the granite particle available. If the granite is first heated to dry the same completely and is then allowed to absorb water or other liquid containing in solution manganese sulfate or other desired element, such element will be contained within the granite particle and will slowly be made available to the fowl, as the particle breaks down in the gizzard.

The recommendation of poultry authorities is that about 4 ounces of manganese sulfate be added to each ton of poultry feed.

After the solution of manganese sulfate or other desired element has been absorbed by the grit, the solvent can either be driven off prior to coating the grit, or the grit particle can be covered immediately, without removing the solvent.

Vitamins may be added adjacent the grit core and then coated with the calcareous flour. Thus in the final product the vitamins will be protected from deterioration by exposure to air.

Other ways of incorporating additional elements in my composite poultry food include the addition of soluble elements to the binder and the blending of insoluble elements with the calcareous flour.

Coloring materials or pigments may be added to the coating if desired. Such coloring material, for example, may be designed to vary the attractiveness of the product to the bird, or to differentiate different types or compositions of poultry food, etc. By this means a supplementary control over the intake of the birds is made possible, since the birds will eat larger quantities of particles which are attractive to them, such as particles having shiny or light colored surfaces.

The present application is a continuation in part of my co-pending application Ser. No. 372,678, filed December 31, 1940.

While I have shown and described a preferred embodiment of my invention, it should be understood that the invention is by no means confined to the exact details herein set forth by way of illustration. It is apparent that many changes and variations may be made by those skilled in the art, without departing from the spirit of the invention or the scope of the appended claims.

I claim:

1. A poultry grit comprising stone particles substantially insoluble in dilute hydrochloric acid and calcareous particles slowly soluble in dilute hydrochloric acid, both types of particles having a coating of a calcium compound in a form which is more readily soluble in dilute hydrochloric acid than either of said types of particles.

2. A poultry grit comprising rock grit particles substantially insoluble for a period of one hundred hours in 5% hydrochloric acid and other rock particles which will dissolve in 5% hydrochloric acid within one hundred hours, said particles being coated with a calcareous material in a form which is soluble in hydrochloric acid.

3. A poultry food comprising granite grit and calcareous grit, both of said types of grit being coated with a calcium compound in a form which is soluble in hydrochloric acid.

4. A poultry grit comprising two types of particles, at least one of said types of particles being a stone and at least one type being calcareous, said types being of relatively different solubility in dilute hydrochloric acid, said particles having a coating of a calcium compound.

5. A poultry grit comprising stone particles substantially insoluble in 5% hydrochloric acid and other calcareous particles relatively soluble in 5% hydrochloric acid, individual particles of both of said types having a coating of a calcium compound in a form which is soluble in 5% hydrochloric acid, the total weight of both of said types of particles exceeding the weight of the soluble coating.

6. Poultry food comprising grit-like stone particles which are substantially insoluble for a period of one hundred hours in five per cent hydrochloric acid, grit-like calcareous particles which are soluble within forty-eight hours in five per cent hydrochloric acid and a calcium compound soluble within twelve hours in five per cent hydrochloric acid and associated with said particles as a coating thereon, the total amount of insoluble material present being less than one-half by weight of the composite poultry food.

7. Poultry food comprising grit-like stone particles substantially insoluble in dilute hydrochloric acid, grit-like calcareous particles relatively soluble in dilute hydrochloric acid, and a coating of a calcium compound on constituent particles in a form which is soluble in hydrochloric acid, the amount by weight of said three ingredients in the composite poultry food being approximately equal.

8. A process for treating poultry grit, said process comprising the steps of mixing together grit-like particles of a stone substantially insoluble in 5% hydrochloric acid and grit-like particles of a calcareous material soluble in 5% hydrochloric acid, moistening the mixture with a liquid binder, adding in finely-divided form a calcium compound which is soluble in hydrochloric acid and agitating the mixture until the grit particles are coated with the calcium compound.

9. A poultry grit comprising grit-like particles selected from the group of materials consisting of granite, traprock, and gravel, the said particles being substantially insoluble in five per cent hydrochloric acid, and other grit-like calcareous particles that are slowly soluble in five per cent hydrochloric acid, both types of particles having a coating of a calcium compound in a form which is more readily soluble in five per cent hydrochloric acid than is either of said types of grit-like particles.

VINCENT H. SHEA.

CERTIFICATE OF CORRECTION.

Patent No. 2,331,807. October 12, 1943.

VINCENT H. SHEA.

It is hereby certified that error appears in the printed specification of the above numbered patent requiring correction as follows: Page 2, second column, line 65, claim 2, after "rock" insert --grit--; and that the said Letters Patent should be read with this correction therein that the same may conform to the record of the case in the Patent Office.

Signed and sealed this 25th day of January, A. D. 1944.

(Seal)

Henry Van Arsdale,
Acting Commissioner of Patents.